United States Patent [19]
Wilhelm et al.

[11] 3,838,554
[45] Oct. 1, 1974

[54] PROCESS FOR THE REMOVAL OF IODINE AND ORGANIC IODINE COMPOUNDS FROM GASES AND VAPOURS, AND SORPTION AGENTS WHCH ARE IMPREGNATED WITH METAL SALTS FOR CARRYING OUT THE REMOVAL PROCESS

[75] Inventors: Jürgen Wilhelm, Leopoldshafen; Heinz Schüttelkopf, Neureut; Ludwig Dorn, Cologne; Gerhard Heinze, Schildgen, all of Germany

[73] Assignees: Bayer Aktiengesellschaft, Leverkusen; Gesellschaft Fur Kernforschung M.B.H., Karlsruhe, both of, Germany

[22] Filed: June 23, 1971

[21] Appl. No.: 156,107

[30] Foreign Application Priority Data
Feb. 26, 1971   Germany............................ 2109146

[52] U.S. Cl........................... 55/71, 55/75, 252/460
[51] Int. Cl.......................................... B01d 53/02
[58] Field of Search............. 55/71, 72, 74, 75, 387, 55/389; 252/454, 460

[56] References Cited
UNITED STATES PATENTS

| | | | |
|---|---|---|---|
| 3,257,776 | 6/1966 | Park et al. ............................... | 55/72 |
| 3,284,369 | 11/1966 | Bergna et al......................... | 252/454 |
| 3,575,888 | 4/1971 | Long............................... | 252/454 X |
| 3,585,217 | 6/1971 | Titzenthalka................... | 252/454 X |
| 3,658,467 | 4/1972 | Maeck............................... | 55/71 X |

*Primary Examiner*—John Adee
*Attorney, Agent, or Firm*—Burgess, Dinklage & Sprung

[57]  ABSTRACT

The present invention relates to a process for the substantial removal of iodine and/or an organic iodine compound which has a low number of carbon atoms from a gas and/or vapour, wherein a gas or vapour containing the iodine and/or iodine compound is passed through a layer of porous particles of a sorption agent which particles comprise amorphous silicic acid and are impregnated with a metal salt, and which have only a low water adsorption and are resistant to hot steam and acid vapours.

8 Claims, No Drawings

PROCESS FOR THE REMOVAL OF IODINE AND ORGANIC IODINE COMPOUNDS FROM GASES AND VAPOURS, AND SORPTION AGENTS WHICH ARE IMPREGNATED WITH METAL SALTS FOR CARRYING OUT THE REMOVAL PROCESS

The invention relates to a process for the rapid and almost complete removal of iodine and/or organic iodine compounds which have a low number of carbon atoms from gases and/or vapours. The invention also relates to sorption agents which are impregnated with metal salts for iodine and/or organic iodine compounds which have a low number of carbon atoms.

For the removal of organic iodine compounds and/or iodine from gases, in particular for the deposition of radioactive iodine obtained as a fission product from atmospheres in nuclear plants, it is known to use activated charcoal or activated charcoal which is impregnated with iodine and/or iodide [R. E. Adams, R. D. Ackley; Chapter 2.1: "Trapping of Radioactive Iodine and methyl iodide by Iodized Charcoal" in nuclear Safety Program Annual Progress Report for Period ending Dec. 31, 1967. ORNL 4228 (April 1968, pages 99 to 114)]. Amine impregnated activated charcoals are also used.

This adsorption material, however, cannot be used in all cases since it is combustible and substantial quantities of adsorbed iodine are released from it at relatively low temperatures, e.g. 150°C. If elevated temperatures occur in the gas which is required to be purified or if vigorous heating of the adsorbing material may be expected due to the heat of decomposition of radioactive fission products, it is necessary to use heat resistant and non-combustible materials.

It has been found that the fission product iodine occurs not only in an elementary form but also in the form of organic compounds with a low number of carbon atoms, for example in the form of radioactive methyl iodide, in the waste gases of nuclear plants. For this reason, in order to be generally applicable adsorbing materials must also be able to retain organic iodine compounds to an equal extent.

Molecular sieves which are impregnated with silver nitrate have been studied for this purpose [D. T. Pence, F. A. Duce, W. J. Maeck: "A Study of the Adsorption Properties of Metal Zeolites for Airborne Iodine Species". A paper presented at the 11th USAEC Air Cleaning Conference, Aug. 31 – Sept. 3, 1970; J. G. Wilhelm: "Trapping of Fission Product Iodine with Silver Impregnated Molecular Sieves", presented at the International Congress on the Diffusion of Fission Products, Saclay, France, Nov. 4th to 6th 1969. Bericht der Gesellschaft fuer Kernforschung m.b.H., Karlsruhe, No.KFK-1065 (Oct. 1969)].

Molecular sieves are sodium aluminosilicates which may have the composition represented e.g. by the following overall formula;

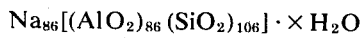

$$Na_{86}[(AlO_2)_{86}(SiO_2)_{106}] \cdot X\,H_2O$$

In the process of impregnation with silver nitrate, the sodium ions are replaced by silver ions. High degrees of deposition have been achieved for methyl iodide and elementary iodine at high relative humidities (for example with the silver impregnated molecular sieve Linde-Ms-13X-Ag), but only if the exchange was carried out practically completely, i.e. if the quantity of silver incorporated with the molecular sieve mass was relatively large compared with the molecular sieve mass, e.g. more than 40 g of Ag/100 g of the molecular sieve. Silver impregnated molecular sieves, however, are not only expensive but also unsuitable for certain purposes because they are not resistant to hot steam and acid vapours.

Other adsorbing materials which may be suitable for the deposition of iodine in some cases under accurately defined conditions of adsorption, e.g. silver impregnated ceramic sintered products (so-called Berl-Saettel), silver coated copper shavings or silver coated silica gel, are either relatively ineffective or completely ineffective for retaining methyl iodide and/or unstable in vapours which contain acid, in particular in moist mixtures of air and nitrogen oxides, or they lose their effectiveness on passing through hot steam. Furthermore, impregnated silica gel has the property of taking up water, which thus reduces its strength. These materials are therefore unsuitable for general use, i.e. for use in various types of iodine removal plants, possibly under varying and possibly even rapidly changing conditions of adsorption, for example, during or after an accident.

It is therefore the object of the invention to provide a process which obviates the disadvantages of the processes operated with the conventional adsorbing materials and which ensures rapid and almost complete removal of iodine and/or organic iodine compounds which have a low number of carbon atoms from the gases and/or vapours, for example from moist mixtures of air and nitrogen oxides, in various types of iodine removal plants, especially in nuclear plants, even under varying and rapidly changing and possibly even extreme operating conditions during and after an accident.

According to the invention, this object is met by a process whereby the gases or vapours which contain iodine and/or iodine compounds are passed through a layer of porous particles of sorption agent impregnated with metal salt, which particles consist predominantly of amorphous silicic acid and which have only a low water adsorption and are resistant to hot steam and acid vapours, this layer of particles being preferably a bed of loosely packed sorption particles (granules such as spheres, rods, grains or splinters). Another advantageous embodiment of the invention comprises passing the gases and vapours through porous bodies composed of particles of sorption agent, in particular of spherical particles, the said porous bodies being e.g. porous plates or porous cylinders, or porous hollow bodies which are open to the direction of feed. The metal salt impregnated sorption agents used for carrying out the process consist of spherical particles or granular particles such as small rods, grains or splinters which have a diameter or length of a few millimetres; a volume porosity of 50 to 80 percent; a specific surface of 70 to 250 m²/g according to BET; a volumetric proportion of pores having a diameter of less than 100 Angstrom units of at least 10% and a volumetric proportion of pores which have a diameter of more than 1000 Angstrom units of at least 5%; and an amorphous silicic acid content of at least 92% by weight, based on the weight of the material before the metal salt impregnation.

The sorption agents used according to the invention may contain a few per cent by weight of aluminium oxide and/or alkaline earth metal oxides in addition to amorphous silicic acid.

Sorption agents which are impregnated with silver nitrate and which have a sliver nitrate content corresponding to 4 to 18 percent by weight of silver, based on the weight of the material before impregnation, have been found to be especially advantageous for the invention. This silver content of the new sorption agents is relatively low, being about 1/10 to 1/15 of the silver content of molecular sieve zeolites which have been exchanged with silver.

It has surprisingly been found that for carrying out the process according to the invention it is especially advantageous to use sorption agents which are characterised by having a relatively small specific surface in the range of from 70 to 250 $m^2/g$ according to BET and a wide pore distribution spectrum of from 20 to 10000 Angstrom units diameter. A certain proportion of very fine active pores in combination with very wide feed pores and a relatively low specific surface obviously is conductive to uniform but relatively dense distribution of the metal salt on the internal surface of the carrier material and good accessability of the absorbing surface for the gases. The relatively low specific surface of the carrier materials is also the cause for their low tendency to water absorption which frequently causes fracture in materials which have larger surfaces. The process according to the invention carried out with the sorption agents claimed above is therefore equally advantageous for the deposition of iodine or organic iodine compounds from gas mixtures which have a low water vapour content and from those which have a high water vapour content.

A suitable starting material for the sorption particles is, for example, the abrasion resistant catalyst carrier in the form of beads produced by the process described in Dutch Offenlegungsschrift No. 6 908 980. The catalyst carrier granulate also in the form of beads but produced by the process described in Dutch Offenlegungsschrift No. 6 914 492 may also be used as the starting material for the particles of sorption agent. The granulates described in Dutch Offenlegungsschriften Nos. 6 908 980 and 6 914 492 are produced as carriers for catalytically active substances, e.g. for phosphoric acid and/or boric acid used for acid catalysed reactions, for vanadates used for $SO_3$ catalysis, for heavy metal salts used for metal catalysed reactions or for noble metals such as platinum and palladium. The catalyst carriers are suitable for any catalytic processes in which silicic acid carriers are prepared with catalytically active substances. The high porosity enables higher contents of such substances to be used than was possible in the carriers previously known, thereby ensuring higher activity. Impregnation of the catalyst carriers with metal salts, for example with a strongly alkaline solution of potassium vanadate, which surprisingly does not reduce the strength of the carrier, has been described in Dutch OS No. 6 908 980, page 7, lines 17 to 20. The carrier material was introduced into a strongly alkaline potassium vanadate solution, left to stand in the cold with occasional stirring and then filtered through a powerful suction filter, dried in air and finally annealed for 2 hours.

Granules of catalyst carrier which are not impregnated or which have been inpregnated with silver nitrate in the manner described for the impregnation with vanadate are not suitable for the process according to the invention for rapid and almost complete removal of methyl iodide and/or iodine by adsorption. The degrees of deposition required for various iodine removal plants, for example in nuclear technology, at least the degrees of deposition required for methyl iodide, are not achieved and the problem which the invention sets out to solve is therefore not solved.

Successful silver nitrate impregnation of the catalyst carrier particles which have a diameter of a few millimetres is achieved only if the process of impregnation includes the steps of exposing the granulate to a vacuum of e.g. 50 mm Hg, adding a neutral silver nitrate solution, eliminating the vacuum and boiling the solution with the granulate, passing the solution through a suction filter and drying the impregnated granulate for several hours at e.g. 150°C. It was observed that one of the sorption reactions leads to a reaction of the methyl iodide in methyl nitrate. This means that the silver nitrate impregnated sorption agent still contains reactive $AgNO_3$. It has been found that silver oxide or silver hydroxide used as an impregnating agent is either too slow in reaction or unreacitve for methyl iodide sorption.

The catalyst carrier granulate which may be used as starting material for the particles of sorption agent is obtained from a suspension of a filler which contains silicic acid together with clay minerals taken from the goup of kaolinite, montmorillonite and attapulgite in an aqueous, stable silicic acid sol, hydrated, finely divided magnesium oxide being added to the suspension and the mixture, which is capable of gelling, being then distributed in droplets of the required size in a liquid which is immiscible with water. The mixture then gels to form granulates in the form of beads, which are separated, dried and then annealed at temperatures of up to 1000°C.

Carbonates, metal oxides or hydroxides which are compatible with silicic acid sol may also be used as the solid materials which are suspended. In such a case, the cations are largely removed from the granules after annealing by acid treatment and the granules are exposed to a second heat treatment at a temperature of from 200°C to 800°C.

A stable, salt-free silicic acid sol used as binder, which has a specific surface of silicic acid particles according to BET of 150 to 400 $m^2/g$ may be obtained by various methods, e.g. by hydrolysis of silicic acid esters, by partial or complete neutralisation of silicate solution with acids or e.g. by ion exchange treatment of silicate solution and concentration by evaporating the silicic acid sol which has been adjusted to an alkaline pH. Shortly before it is divided up into droplets, the silicic acid sol is mixed with an aqueous suspension of hydrated, finely divided MgO used as gelling agent in a quantity of from 0.1 to 3 percent by weight, based on the anhydrous granulate. The MgO is obtained, for example, by careful dehydration of basic magnesium carbonate. Fillers which contain silicic acid are understood to mean mainly synthetic silicic acid of large surface area which has been obtained by precipitation from an alkali metal silicate solution and which, in contrast to silicic acid gels, has a flocculent secondary structure. In the preparation of the silicic acid fillers, the size of the primary particles and hence the specific surface as well as the seondary structure can to a large extent be controlled by the concentration and temperature of the solutions and by the rate of precipitation and intensity of stirring, for example. Fillers which have a specific surface of 20 to 200 $m^2/g$ according to BET are suitable. Fillers which have a lower specific surface than 20 m²/g are as unsuitable for the production of catalyst carrier granulate as the corresponding natural products, e.g. diatomaceous earth or kieselguhr, which have a specific surface in the range of from about 5 to 25 m²/g. Granulates produced from such products have insufficient strength. On the other hand, fillers which have higher BET values than 200 m²/g are less suitable because their higher activity in many cases causes them to catalyse unwanted side reactions. The addition of solid materials such as clay minerals taken from the group of kaolinite, montmorillonite and attapulgite substantially increases the mechanical strength of the finished carrier bodies after drying and annealing, and especially in cases where attapulgite is added the green strength of the beads while still moist is improved.

The invention will now be further described with the aid of experimental results given in the form of examples but the invention is not restricted to the examples given.

Example 1

5000 g of a metakaolin prepared by the impact calcining of kaolin (composition of metakaolin: 53.9% $SiO_2$, 42.5% $Al_2O^3$ and traces of $TiO_2$, $Fe_2O_3$, $K_2O$, $Na_2O$ and MgO) and having a specific surface of 22 m²/g according to BET are suspended in 10 litres of aqueous silicic acid sol (density 1.20 g/ml, 30% by weight $SiO_2$) having a specific surface of 193 m²/g according to BET, using a high speed stirrer.

10 l/h of the above mentioned suspension and 1.5 l/h of an aqueous magnesium oxide suspension containing 80 g of MgO/litre are continuously supplied to a mixing vessel by means of dosing pumps. The gellable mixture of these two suspension, divided up into jets by a star-shaped distributor device, could then flow from the mixing vessel into a liquid column consisting of a mixture of o-dichlorobenzene and perchloroethylene having a density of 1.4 g/ml. The jets are divided up into droplets in the organic phase, and these droplets solidify to form beads within a few seconds by solgel conversion.

The granulate, which was still capable of being shaped, was separated from the organic phase, dried with saturated steam, freed from organic liquid adhering to it and then dried in a gentle stream of air at 120°C for one hour. A granular material having a water uptake capacity of 68 g of water per 100 g of dry material was obtained.

The granular material was acid extracted with acid to increase the pore volume. For this purpose, the material was extracted for 8 hours in a cycle with hot azeotropic hydrochloric acid used in excess, based on the quantity of soluble oxides. It was then washed free from chlorides, dried and annealed at 700°C for 2 hours. The water uptake capacity of the finished granules was 98 g of water per 100 g of dry granular material.

The resulting granules of catalyst carrier were exposed to a vacuum of 50 mm Hg. A neutral silver nitrate solution was then introduced and covered the granules while the vacuum was maintained. After aeration, the solution containing the material which was to be impregnated was boiled for 1 to 2 hours at normal pressure and then passed through a suction filter, and the resulting sorption agent was dried overnight at about 150°C.

Example 2

A sieve fraction of 1 to 2 mm was removed from the catalyst carrier granules prepared according to Example 1. The sieved beads, which has an $SiO_2$ content of 96 per cent by weight; and $Al_2O_3$ content of 2 per cent by weight; a particle diameter range of 1 to 2 mm; an integral porosity of 65 volumes percent; a bulk density of 0.4 g/cm³; a specific surface (according to BET) of 190 m²/g; a pore diameter range of about 20 to 7500 Angstrom units; and a proportion by volume of pores having a diameter of less than 100 Angstrom units of 15% and a proportion by volume of pores having diameters of more than 1000 Angstrom units of 35 per cent were impregnated with silver nitrate solution so that 7.8 g of silver were taken up per 100 g of unimpregnated material. A stream of air having a relative humidity of 70% and a linear air velocity of 15 m/min was passed at 30°C through filter beds of silver nitrate impregnated catalyst carrier material with a depth of bed of a. 7.5 cm and
b. 10.0 cm.

During various experimental operations, the stream of moist air had a methyl iodide concentration of 100 ±30 mg $CH_3I/m^3$ (labelled with $^{131}I$).

The removal of methyl iodide in the filter a. with a depth of bed of 7.5 cm and a time of stay of the quantity passed through of 0.3 seconds was 99.970% and
b. with a depth of bed of 10.0 cm and a time of stay of the quantity passed through of 0.4 seconds it was 99.9944%.

For the sake of clarity, the decontamination factors (DF) corresponding to the percentages, which are often more customarily used for radioactivity removal, are indicated below:

a. $DF = 3.3 \cdot 10^3$
b. $DF = 1.8 \cdot 10^4$.

Example 3

Superheated steam containing $CH_3I$ was passed at 150°C through filter beds of the silver nitrate impregnated catalyst carrier material described in Example 2. The methyl iodide removal a. in a filter bed having a depth of 7.5 cm and with a time of stay of 0.3 seconds amounted to 99.9972%, which corresponds to a DF of $3.5 \cdot 10^4$, and
b. in a filter bed having a depth of 10.0 cm and with a time of stay of 0.4 seconds it amounted to 99.9990%, which corresponded to a DF of $1.0 \cdot 10^5$.

Example 4 a. A filter bed of $AgNO_3$ impregnated catalyst carrier material described in Example 2 having a depth of 10 cm was charged with a total of 7.2 mg of iodine per g of sorption agent. The carrier gas passed through the bed was a mixture of air and nitrogen oxide containing 10 volumes per cent of $NO_2$ and having an iodine concentration of about 230 mg of $I_2/m^3$, the time of stay being 0.4 seconds. The removal of $I_2$ amounted to 99.87%, corresponding to a DF of $7.7 \cdot 10^2$.

b. A filter bed, 10 cm in depth, of $AgNO_3$ impregnated catalyst carrier material described in Example 2 was charged with a total of 27.7 mg of iodine per g of sorption agent. The carrier gas passed through the bed was an air-nitrogen oxide, mixture containing 10 volumes per cent of $NO_2$ and having an $I_2$ concentration of 440 mg/m$^3$, the time of stay being 0.4 seconds. Removal of $i_2$ amounted to 99.88%, corresponding to a DF of $8.3 \cdot 10^2$.

c. A filter bed, 10 cm in depth, of $AgNO_3$ impregnated catalyst carrier material described in Example 2 but containing 8.0 g of Ag/100 g instead of 7.8 g of silver per 100 g of unimpregnated absorption agent was charged with 1.6 mg of $CH_3I$ per g of impregnated sorption agent. The carrier gas passed through the filter bed was a mixture of air and nitrogen oxide containing 8 volumes per cent of $NO_2$ and having a $CH_3I$ concentration of 60 mg/m$^3$, the time of stay being 0.4 seconds. Removal amounted to 99.960%, corresponding to a DF of $2.5 \cdot 10^3$.

Example 5

Air having a relative humidty of 70% and an iodine concentration of 150 mg/m$^3$ was passed at a temperature of 30°C through a filter bed of $AgNO_3$-impregnated catalyst carrier material described in Example 2 which had a depth of 10 cm. Iodine removal amounted to 99.990%, corresponding to a DF of $1.0 \cdot 10^4$.

Almost equally good results were obtained in subsequent experiments using beds of less depth. This means that at least a part of the very small percentage still remaining for 100% complete removal is due to an iodine compound which cannot be absorbed as easily as iodine or $CH_3I$.

Practically no iodine desorption could be detected over a period of more than 30 days from $AgNO_3$ impregnated, charged catalyst carrier material at elevated temperatures in a continuous stream of air, for example at 300°C.

Example 6

2800 g of a silicic acid filler preciptiated from waterglass with calcium chloride and aqueous hydrochloric acid and 1200 g of kaolin were suspended in 10 l of aqueous silicic acid sol (density 1.20 g/ml, 30% by weight $SiO_2$) having a specific surface according to BET of 200 m$^2$/g, using a high speed stirrer. The silicic acid filler had a specific surface of 50 m$^2$/g according to BET and an average particle diameter of 7.5 $\mu$ which was determined by weighing. It consisted of 75% of $SiO_2$, 8% calcium oxide and 17% of free and bound water. The kaolin had an average particle diameter of 6.3 $\mu$ determined by weighing. It consisted of 47% of $SiO_2$, 38% of $Al_2O_3$, 15% of water and traces of other oxides. The composition of the suspension, based on the dry substance, was therefore calculated to be approximately 47% by weight of $SiO_2$ from the silica sol, approximately 37% by weight of silic acid filler and approximately 16% by weight of kaolin, or according to the chemical composition it was calculated to contain, based on the solid substance, approximately 90% by weight of $SiO_2$, approximately 7% by weight of $Al_2O_3$ and approximately 3% by weight of CaO.

10 l/hour of the above mentioned suspension and 1.2 l/h of an aqueous magnesium oxide suspension containing 80 g of MgO/l were continuously supplied to a mixing vessel by means of dosing pumps. The gellable mixture of the two suspensions flowed on to a rotating distributor device from the mixing vessel. It was divided into thin jets by the distributor device. A column filled with o-dichlorobenzene was situated underneath the distributor device. On entering the organic medium, the jets of suspension broke up into spherical droplets which solidified by gelling while they sank.

The granular material, which was still capable of being shaped, was separated from o-dichlorobenzene, dried in a stream of air and then heated to 700°C for 2 hours. Very hard bead having diameters of 0.4 to 2 mm were obtained. The specific surface of this material according to BET was 114 m$^2$/g, its pore volume 501 mm$^3$/g.

The bead granules obtained were circulated with a 50% excess of aqueous 20% hydrochloric acid heated to 70°C, the excess being calculated on the $Al_2O_3$, CaO and MgO content, and then washed free from acid, dried at 110°C and annealed at 700°C for one hour.

The specific surface of the extracted granular material was 125 m$^2$/g according to BET and the pore volume 575 mm$^3$/g.

The resulting granular material was impregnated with silver nitrate as described in Example 1. silver nitrate as described in Example 1.

Example 7

Beads prepared according to Example 6, having an $SiO_2$ content of 97% by weight, an $Al_2O_3$ content of 1% by weight, a particle diameter range of 0.4 to 2 mm, an integral porosity of 57 volumes per cent, a bulk density of 0.65 g/cm$^3$, a specific surface of 125 m$^2$/g, a pore diameter range of 40 to 2000 Angstrom units, a proportion by volume or pores having diameters of less than 100 Angstrom units of 28% and a proportion by volume of pores having diameters of more than 1000 Angstrom units of 10% were impregnated with $AgNO_3$ solution so that 6.8 g of silver per 100 g of unimpregnated material were taken up.

Air at a temperature of 30°C and relative humidity of 70% and having a $CH_3I$ concentration of 100 ±30 mg/m$^3$ was passed through filter beds
 a. 7.5 cm in depth and
 b. 10.0 cm in depth.
Removal of $CH_3I$ amounted to
 a. 99.9982%, corresponding to a DF of $5.6 \cdot 10^4$ and
 b. 99.9995%, corresponding to a DF of $2.0 \cdot 10^5$.

Example 8

Beads of a catalyst carrier material prepared according to Example 1 but consisting of pure silicic acid and having a particle diameter range of 1 to 2 mm, an integral porosity of 70 volumes percent, a bulk density of 0.35 g/cm$^3$, a specific surface of 120 m$^2$/g, a pore diameter range of 40 to 5000 Angstrom units, a proportion by volume of pores having diameters of less than 100 Angstrom units of 12% and a proportion by volume of pores having diameters of more than 1000 Angstrom units of 50% were impregnated with $AgNO_3$ solution so that 14.0 g of silver were taken up per 100 g of unimpregnated material.

Air at a temperature of 30°C and relative humidity 70% and having a $CH_3I$ concentration of 100 ±30 mg/m$^3$ was passed through filter beds
 a. 7.5 cm in depth and
 b. 10.0 cm in depth.
Removal of $CH_3I$ amounted to
 a. 99.86%, corresponding to a DF of $7.1 \cdot 10^2$ and b. 99.986% corresponding to a DF of $7.1 \cdot 10^3$.

The removal of methyl iodide could be still further improved, up to the limits of measurement of the apparatus, by increasing the silver content in the impregnated catalyst material.

What we claim is:

1. A metal salt-impregnated sorption agent for a member selected from the group consisting of iodine and organic iodine compounds which have a low number of carbon atoms, comprising particles in a form selected from the group consisting of spheres and granules having a diameter of length of a few millimeters; a volume of porosity of 50 to 80%; a specific surface of 70 to 250 m²/g according to BET; a proportion by volume of pores having diameters of less than 100 Angstrom units of at least 10%; a proportion by volume of pores having a diameter of more than 1000 Angstrom units of at least 5%; and an amorphous silicic acid content of at least 92% by weight, based on the weight of the material exclusive of the metal salt, the metal salt being present in an amount of about 4 to 18% by weight of metal based on the weight of the balance of the sorption agent, the metal of said salt being reactive with iodine.

2. A metal salt-impregnated sorption agent as claimed in claim 1, with silver nitrate as the impregnating material.

3. A metal salt-impregnated sorption agent as claimed in claim 2 further including a few percent of at least one member selected from the group consisting of aluminum oxide and an alkaline earth metal oxide.

4. In the removal of iodine or an iodine-containing organic compound from a gas wherein the iodine or iodine-containing compound is passed through a layer of porous particles of a sorption agent to remove said iodine from said gas, the improvement which comprises employing as said sorption agent particles of amorphous silicic acid impregnated with the salt of a metal reactive with iodine, said sorption agent having a low water adsorption and being resistant to hot steam and acid vapors, said particles being spherical in form, having a diameter of a few millimeters, a volume porosity of 50 to 80%, a specific surface of 70 to 250 m²/g according to BET, a proportion by volume of pores having diameters of less than 100 Angstrom units of at least 10%, a proportion by volume of pores having a diameter of more than 1000 Angstron units of at least 5%, and an amorphous silicic acid content of at least 92% by weight, based on the weight of the material exclusive of the metal salt, the metal salt being present in an amount of about 4 to 18% by weight of metal based on the weight of the balance of the sorption agent.

5. A process according to claim 4, wherein the salt is a silver salt.

6. A process according to claim 5, wherein the salt is silver nitrate.

7. A process according to claim 6, wherein the sorption agent contains silver nitrate in an amount of about 4 to 18% by weight expressed as silver based on the weight of the balance of the sorption agent.

8. A process according to claim 7, wherein the sorption agent further contains a few percent of at least one member selected from the group consisting of aluminum oxide and an alkaline earth metal oxide.

* * * * *